C. A. FETTERS.
LEASH STICK.
APPLICATION FILED DEC. 1, 1917.
1,331,633.
Patented Feb. 24, 1920.
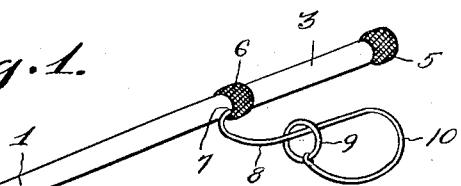
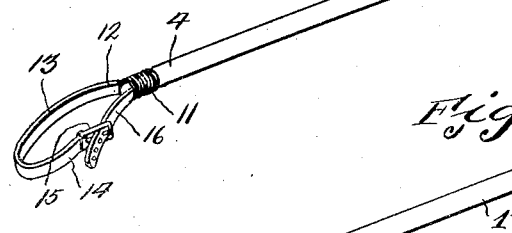
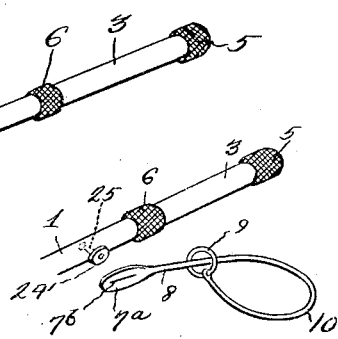
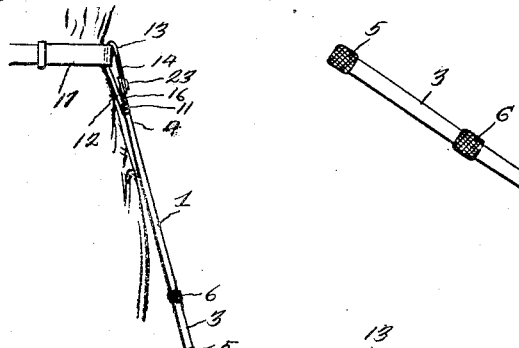
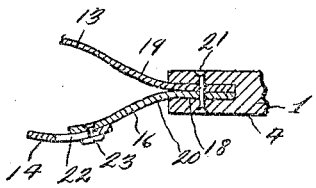
Inventor
Charles A. Fetters
By
his Attorney

UNITED STATES PATENT OFFICE.

CHARLES A. FETTERS, OF WASHINGTON, DISTRICT OF COLUMBIA.

LEASH-STICK.

1,331,633.  Specification of Letters Patent.  Patented Feb. 24, 1920.

Application filed December 1, 1917. Serial No. 204,873.

*To all whom it may concern:*

Be it known that I, CHARLES A. FETTERS, a citizen of the United States, residing at Washington, District of Columbia, have invented certain new and useful Improvements in Leash-Sticks, of which the following is a specification, reference being had therein to the accompanying drawing.

The invention relates to swagger sticks and has for its object to provide a swagger stick, which may be easily and quickly attached and suspended from the belt of the user, thereby providing means whereby the use of the stick may be dispensed with. Swagger sticks now in use have no means whereby they may be carried by the user except in the hand. It is common practice for soldiers to force one of the ends of the stick into the top of one of their leggings, which makes it awkward to walk and also damages the leg of their trousers besides being uncomfortable while walking.

A further object is to provide the stick, near its handle end, with a leather thong, which is provided on its end, with a ring, so that a bight of the thong may be passed through the ring, thereby forming a loop for suspending the swagger stick from the wrist of the user. Also to provide a substantially rigid leash for animals whereby they may be easily held at a distance from the legs of the leader of the animal.

Other objects will appear and be better understood from the embodiment of the invention of which the following is a specification, reference being had to the accompanying drawing forming part thereof, in which:—

Figure 1 is a perspective view of the swagger stick, showing the belt attaching loop thereon and the wrist engaging member in position to be placed around the wrist.

Fig. 2 is a perspective view of the stick, showing another form of the loop, the wrist attaching member being eliminated.

Fig. 3 is a view showing the swagger stick suspended from the belt of the user.

Fig. 4 is a view showing the stick and its loop used as a leash.

Fig. 5 is a sectional detail view of the loop attaching means as shown in Fig. 2.

Fig. 6 is a perspective view showing another form of attaching means for the wrist engaging loop.

Referring to the drawings the numeral 1 designates the body member of the stick, which may be made of any kind of material but preferably of wood such as rattan or the like. This body member 1 may be covered with leather or cloth, or may be painted. The body member 1 tapers from the handle section 3 to the end 4, the handle section 3 being provided with bands 5 and 6 so that the stick will be prevented from slipping through the hand of the user and also providing a finish to the stick. Secured to the stick, by means of the band 6, is the end 7, of a leather thong 8, which is provided on its end with a ring 9. The leather thong may be looped through the ring 9 so as to form a bight 10, through which the hand and wrist of the user may be passed and the stick suspended from the wrist. Secured to the end 4 of the stick, by means of a cord wrapping 11 is the end 12 of the strap 13, the end 14 of which is provided with a buckle 15. Also secured to the end 4 of the stick, by means of the wrapping 11 is one end of a strap 16, the free end of which is adapted to pass through and be held by the buckle 15, thereby providing a loop that may be easily opened and passed around a belt 17 as shown in Fig. 3.

Body member 1 is substantially rigid and it will be seen by reference to Fig. 4 that when the loop is placed and secured on a dog collar, that by grasping the handle end 3, said dog or any other animal may be maintained at a distance from the leader of the animal. The advantage in this being that, especially in the case of a dog, the dog will be prevented from wrapping the leash around the legs of the leader, or when the leash is secured to the bridle on a horse it will be possible to keep the horse's head at a distance from the leader, which is a decided advantage if the horse is of a vicious or biting nature.

Fig. 2 shows a modified form of the invention, the thong 8 being dispensed with. In this form the end 4 of the body member is provided with a kerf 18, into which the strap ends 19 and 20 are placed and held in position by means of the rivet 21. The end 14 of the loop 13 in this form is provided with a slit 22, which is adapted to receive the button 23 secured to the end of the strap 16.

In Fig. 6 the end 7ᵃ of the leather thong is provided with a slit 7ᵇ, adapted to button over the button or lug 24, which is riveted to the body member 1 by means of a rivet 25.

The invention having been set forth what is claimed as new and useful is:—

An article of manufacture for use as a leash or the like comprising a substantially rigid body member having a handle portion and provided at one end with a member forming a loop and having detachable fastening whereby said loop may be readily opened.

In testimony whereof I hereunto affix my signature.

CHARLES A. FETTERS.